United States Patent
Packer et al.

(10) Patent No.: US 10,001,792 B1
(45) Date of Patent: Jun. 19, 2018

(54) SYSTEM AND METHOD FOR DETERMINING OCCUPANCY SCHEDULE FOR CONTROLLING A THERMOSTAT

(71) Applicant: OPOWER, INC., Arlington, VA (US)

(72) Inventors: Ben Packer, Palo Alto, CA (US); Agustin Fonts, Santa Clara, CA (US); Erik Shilts, San Francisco, CA (US); Garner Chung, Oakland, CA (US); Richard Tyler Curtis, Washington, DC (US)

(73) Assignee: OPOWER, INC., Arlington, VA (US)

( * ) Notice: Subject to any disclaimer, the term of this patent is extended or adjusted under 35 U.S.C. 154(b) by 526 days.

(21) Appl. No.: 14/303,165

(22) Filed: Jun. 12, 2014

Related U.S. Application Data

(60) Provisional application No. 61/834,166, filed on Jun. 12, 2013.

(51) Int. Cl.
   *G05D 23/32* (2006.01)
(52) U.S. Cl.
   CPC .................. *G05D 23/32* (2013.01)
(58) Field of Classification Search
   CPC ........ G05D 23/32; G05D 23/30; G05D 23/19; G05D 23/1902; G05D 23/1904; G05D 23/1393; F24F 11/006; F24F 11/0034; F24F 11/0086; F24F 2011/0046; F24F 2011/0047; F24F 2011/0061; F24F 2011/0064; F24F 2011/0073; F24F 2011/0075
   See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |

(Continued)

FOREIGN PATENT DOCUMENTS

| | | |
|---|---|---|
| CA | 2779754 | 5/2011 |
| CA | 2832211 | 11/2012 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — M. N. Von Buhr
(74) *Attorney, Agent, or Firm* — Cooper Legal Group LLC

(57) ABSTRACT

An occupancy schedule determining method and system that receives usage data indicating a quantity of a resource supplied by a utility that is used at the location over a plurality of days, each of the plurality of days being subdivided into a plurality of predetermined time periods, and the usage data indicating the quantity of the resource supplied by the utility that is used during each of the predetermined time periods, aggregates the usage data for each of the plurality of predetermined time periods over the plurality of days, and uses the aggregated usage data to determine the occupancy schedule at the location using a processor.

17 Claims, 11 Drawing Sheets

(56) References Cited

U.S. PATENT DOCUMENTS

| | | |
|---|---|---|
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,778,734 B2 * | 8/2010 | Oswald ................ G05B 15/02 340/662 |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| RE45,574 E * | 6/2015 | Harter ................ F24F 11/0012 |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| RE46,236 E * | 12/2016 | Harter ................ F24F 11/0012 |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0120370 A1* | 6/2003 | Kitayama ................ H02J 3/008 700/100 |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0187286 A1* | 7/2009 | Magalhaes Medeiros Neto ................ F25B 49/02 700/299 |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0019051 A1* | 1/2010 | Rosen ................ F24F 11/0012 236/46 R |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0283606 A1* | 11/2010 | Tsypin ................ G06Q 30/02 340/540 |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |

(56) References Cited

U.S. PATENT DOCUMENTS

| | | | |
|---|---|---|---|
| 2011/0015798 A1* | 1/2011 | Golden | G06Q 10/06 700/291 |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0165993 A1* | 6/2012 | Whitehouse | G05D 23/1904 700/278 |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0030600 A1* | 1/2013 | Shetty | F24F 11/006 700/300 |
| 2013/0055132 A1* | 2/2013 | Foslien | G06F 17/30554 715/771 |
| 2013/0060531 A1 | 3/2013 | Burke et al. | |
| 2013/0060720 A1 | 3/2013 | Burke | |
| 2013/0073094 A1* | 3/2013 | Knapton | F24F 11/0034 700/278 |
| 2013/0097177 A1 | 4/2013 | Fan et al. | |
| 2013/0097481 A1 | 4/2013 | Kotler et al. | |
| 2013/0138651 A1* | 5/2013 | Lu | G06N 3/088 707/737 |
| 2013/0173064 A1 | 7/2013 | Fadell et al. | |
| 2013/0173191 A1* | 7/2013 | McDonald | H02J 3/00 702/61 |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0172503 A1* | 6/2014 | Hammerstrom | G06Q 30/0206 705/7.31 |
| 2014/0207292 A1 | 7/2014 | Ramagem et al. | |
| 2014/0277765 A1* | 9/2014 | Karimi | G05B 15/02 700/276 |
| 2014/0337107 A1 | 11/2014 | Foster | |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0256401 A1* | 9/2015 | Zinger | H04L 41/14 370/401 |
| 2015/0267935 A1 | 9/2015 | Devenish et al. | |
| 2015/0269664 A1 | 9/2015 | Davidson | |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0316907 A1* | 11/2015 | Elbsat | G06Q 10/04 700/275 |
| 2015/0319119 A1 | 11/2015 | Ryu et al. | |
| 2015/0324819 A1 | 11/2015 | Lin et al. | |
| 2015/0326679 A1 | 11/2015 | Lin et al. | |
| 2016/0042049 A1* | 2/2016 | Shilts | G06F 17/30592 707/603 |

FOREIGN PATENT DOCUMENTS

| | | |
|---|---|---|
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2013023691 A1 * 2/2013 | H02J 3/14 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

(56) References Cited

OTHER PUBLICATIONS

Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not A Bill," posted at Not A Mystery, posting date Apr. 18, 2015, available at http://notamystery.com/2015/04/18/not_worth_the_papeUts_printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "Opower," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I-II: Basic Concept, Structure, and Methodology," IEEE Transactions On Power Delivery, vol. 25, No. 2, pp. 551-569, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions On Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

SYSTEM AND METHOD FOR DETERMINING OCCUPANCY SCHEDULE FOR CONTROLLING A THERMOSTAT

CROSS-REFERENCE TO RELATED APPLICATION

This application claims priority to and the benefit of U.S. Provisional Patent Application No. 61/834,166, filed on Jun. 12, 2013, the disclosure of which is incorporated by reference herein in its entirety.

BACKGROUND

Field

The present disclosure relates generally to energy conservation and more specifically to determining an occupancy schedule based on resource usage data.

Description of the Related Art

Households with programmable thermostats often do not program the thermostats with schedules and set points because the programming the thermostats is considered time consuming or complicated. Instead, some users prefer to manually manage schedules and set points. Manually managing the thermostat may lead to sub-optimal energy efficiency and customer satisfaction outcomes. Other households may program thermostats with schedules that do not accurately reflect occupancy periods or may fail to update the schedules programmed into thermostats to reflect changes in occupancy periods. These sub-optimal schedules may also lead to sub-optimal energy efficiency and customer satisfaction outcomes.

Energy efficiency is compromised if the household leaves the thermostat on when not at home or if the household turns the thermostat past the desired setting in an attempt to speed up the heating, ventilation, and air conditioning (HVAC) system. Customer satisfaction may be decreased through continually managing small temperature changes (e.g., during the heating season, decreasing the heating set point by five degrees every night before going to sleep and increasing the heating set point by five degrees every morning after waking up) and by having a sub-optimal temperature when moving to a new occupancy state (e.g., waking or returning home).

New smart devices may ameliorate these problems if provided with schedules, by efficiently using the HVAC system to control the household temperature according to the user's preferences.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
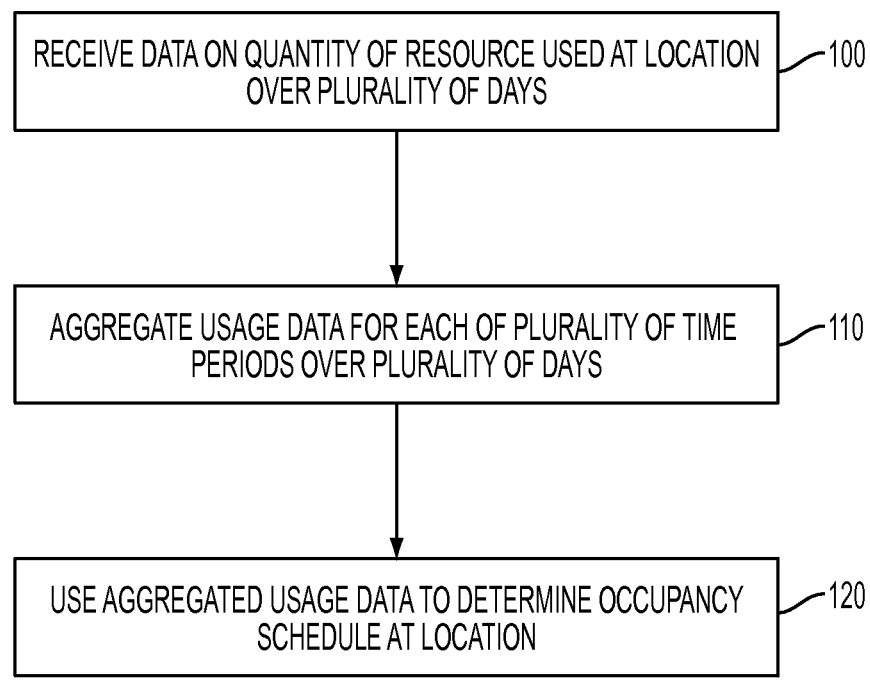
FIG. 1 is a flow diagram illustrating a process for determining an occupancy schedule at a location, according to an embodiment.

A system and method according to an embodiment may determine an occupancy schedule at a location without the need for user input based on resource usage data (e.g., energy usage data) and provide the schedule to a thermostat or smart device, enabling the thermostat or smart device to increase energy efficiency and customer satisfaction by learning the household's schedule.

A detected occupancy schedule may be used for many purposes. For example, the detected occupancy schedule may be: (1) provided to a network connected thermostat configured to automatically set a set point schedule based on the detected occupancy schedule without the need for user input, thus making the configuration process of a thermostat fast and accurate from the moment a connected thermostat is installed; (2) periodically provided to a network connected thermostat so that, as a user's occupancy habits change, settings for the thermostat may be automatically adjusted based on an updated occupancy schedule without needing the user to adjust the thermostat manually; (3) used to determine energy and/or cost savings generated from adopting a more efficient schedule based on the detected occupancy schedule (e.g., based on modeled savings associated with adopting the more efficient schedule, or based on a comparison with savings from neighbors with similar schedules); (4) presented to a user as part of a questionnaire about his or her usage or occupancy habits; (5) used to determine different time-of-use tariff rates for a utility company to offer; (6) used in a connected home (e.g., a home having networked appliances, lighting, and/or HVAC systems) to optimize scheduled tasks (e.g., running a load of laundry based on the home's detected schedule); (7) determine targeted energy saving tips and promotions to present to utility customers based on the amount of time they are home (e.g., a residential customer may be presented with a tip or promotion to upgrade to energy efficient light bulbs based on a savings potential calculated from the number of evening hours the customer is awake at home); (8) used as inputs to other models such as those that predict customer satisfaction, when a residence is on vacation, or a set point identifier; (9) used by demand response providers to send more aggressive duty cycle programming to homes during periods of non-occupation; or (10) used to make more accurate demand response load shed calculations given the occupancy patterns of the participating residences.

Additionally, outside of the residential setting, a detected occupancy schedule may be used for a variety of purposes, including but not limited to: (1) an office building, which typically has regular hours of operation, may use schedule detection to identify excessive energy use outside of the expected hours of operation for the business (e.g., the parking lot lights may be flagged as being on past the expected time or certain components of the HVAC system may be flagged as being left on overnight when no occupants are in the building); (2) a courier service with knowledge of when a home is occupied may optimize their delivery schedules to reduce the amount of failed deliveries due to the lack of a person available to provide a signature; (3) residential fire alarm systems may suggest to first responders whether or not a building is occupied during an emergency event; or (4) residential burglary alarm systems may determine real versus false alarms given historical occupancy states.

FIG. 1 is a flow diagram illustrating a process for determining an occupancy schedule at a location, according to an embodiment. In block 100, usage data about a quantity of a resource used at a location over a plurality of days are received. The usage data may include sub-daily usage data (i.e., usage data for a plurality of time periods each day, such as each hour of the day) for any resource that is correlated with occupancy, such as electricity, gas, network bandwidth or data, and/or water. Other resource usage data may also be used.

Figure 6:
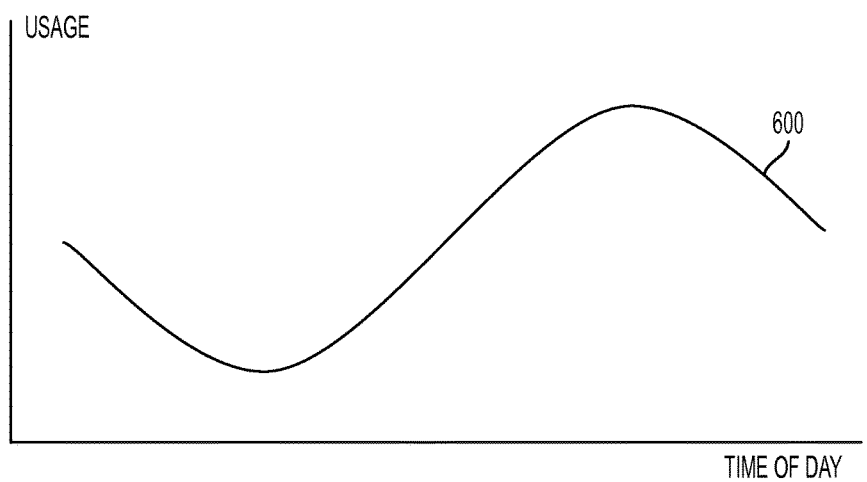
FIG. 6 is a diagram illustrating a usage curve for an archetypical stay at home schedule, according to an embodiment.
Figure 7:
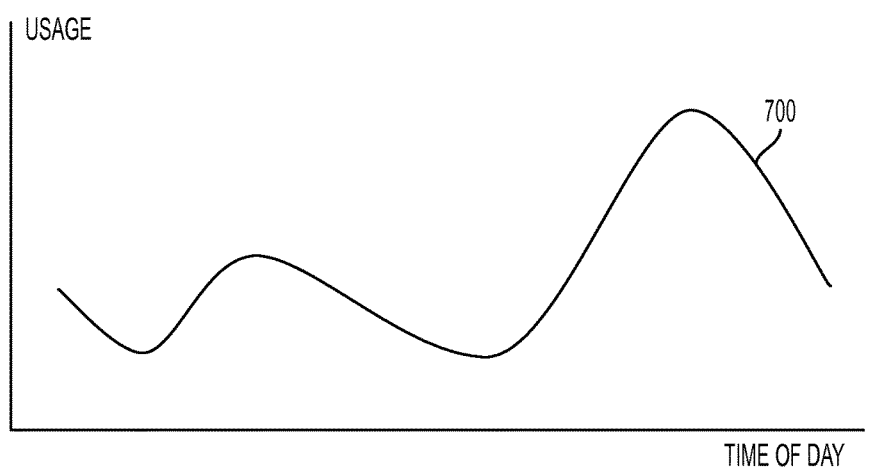
FIG. 7 is a diagram illustrating a usage curve for an archetypical nine-to-five schedule, according to an embodiment.
Figure 8:
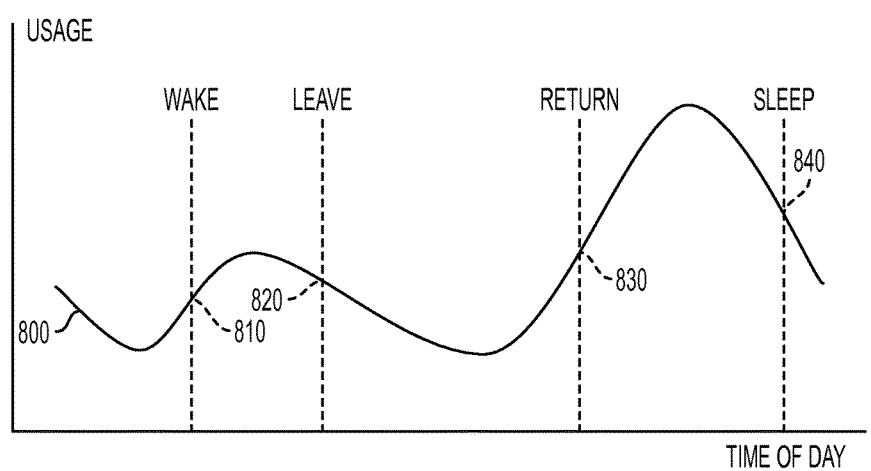
FIG. 8 is a diagram illustrating a usage curve for an archetypical nine-to-five schedule and an imputed schedule, according to an embodiment.

The usage data over time may be represented as a load curve (i.e., a chart illustrating the variation in usage over time, such as that shown in FIGS. 6, 7, and 8).

According to an alternative embodiment, the usage data represented as a load curve may also be supplemented or substituted with demographic, geographic, psychographic, and/or parcel data describing a given building and its occupants and/or data about a user's interactions with a thermostat. These data may be used by a system for determining an occupancy schedule at a location as direct inputs, regularization parameters, or for pre-processing. For example, a load curve may indicate significantly decreased usage at night, which may be used as described below to determine that indicate that the building is unoccupied or that building occupants are sleeping at night. If the load curve data is supplemented by parcel data indicating that a building is an office, this supplemental data may be used to determine that the building is unoccupied at night, rather than being occupied by sleeping occupants.

Next, in block 110 of FIG. 1, the usage data for each of the plurality of time periods (e.g., each hour of the day) over a plurality of days may be aggregated. If the daily usage data is highly variant, aggregations, such as mean or median usage by hour of the day over some period, may be used. For example, usage data for the time period from 10:00 a.m. to 10:59 a.m. for each of the previous 30 days may be added together and the sum divided by 30 to determine a mean usage amount for the 10 a.m. hour. Alternatively, for a building having a consistent schedule (e.g., a business), it may be unnecessary to aggregate the usage data and instead raw usage data may be used. For example, usage data from the previous day for the time period from 10:00 a.m. to 10:59 a.m. may be used.

The detected occupancy schedule may be influenced depending on the aggregation and time period used. Aggregations may be preferable to raw usage data because of the high dimensionality of raw usage data over a long period of time and the susceptibility to outlier reads (e.g., a scenario in which the sample period includes a vacation period). Shorter aggregation periods may be preferable if occupancy schedules change over time as it may be possible to detect changes to occupancy schedules. However, using aggregation periods that are too short may not reflect a general pattern that would be captured by a longer aggregation period.

Usage data may be subdivided for aggregating by time-based status such as day of the week, weekday or weekend, month of the year, holiday or non-holiday, peak-usage event, etc. For example, in step 110, in the process of detecting a weekday occupancy schedule, usage data for the time period from 10:00 a.m. to 10:59 a.m. for each of the 20 previous weekdays may be added together and the sum divided by 20 to determine a mean usage amount for the 10 a.m. hour on weekdays. Likewise, in step 110, in the process of detecting a weekend occupancy schedule, usage data for the time period from 10:00 a.m. to 10:59 a.m. for each of the 10 previous weekend days may be added together and the sum divided by 10 to determine a mean usage amount for the 10 a.m. hour on weekends. Usage data may also be subdivided by combining these statuses (e.g., day of week by month to detect an occupancy schedule for a particular day of the week in a particular month). These subdivisions allow occupancy schedules that change based on the type of day to be detected.

Next, in block 120 of FIG. 1, the aggregated usage data is used to determine an occupancy schedule at the location, as described in detail below. Various methods may be used to determine the occupancy schedule using the aggregated usage data from block 110, including but not limited to the archetype-based methods, neighbor-dependent methods, path dependent methods, and path independent methods that are described in detail below. The occupancy schedule as determined using one or more of the methods described below may include various occupancy states that capture the modes in which a building may be occupied as well as times of day when the various occupancy states start and/or end. For example, the determined occupancy schedule may reflect occupancy states including "wake up," "leave home," "return home," and/or "go to sleep." A start time of 7:00 a.m. may be associated with the "wake up" occupancy state, a start time of 7:45 a.m. may be associated with the "leave home" occupancy state, a start time of 6:00 p.m. may be associated with the "return home" occupancy state, and a start time of 11:00 p.m. may be associated with the "go to sleep" occupancy state, as an example.

The determined occupancy schedule may vary by type of day (e.g., day of the week, weekday or weekend, month of the year, holiday or non-holiday, peak-usage event, etc.) and reflect differing occupancy states and/or start times for the occupancy states. For example, if usage data for weekdays is aggregated in block 110, a weekday occupancy schedule may be determined in block 120. Likewise, if usage data for weekends is aggregated in block 110, a weekend occupancy schedule may be determined in block 120. The weekend occupancy schedule may only include the "wake up" and "go to sleep" occupancy states if the building is occupied all day on the weekend. Additionally, the start times for the "wake up" and "go to sleep" occupancy states may be different in the weekend occupancy schedule and in the weekday occupancy schedule.

Figure 2:
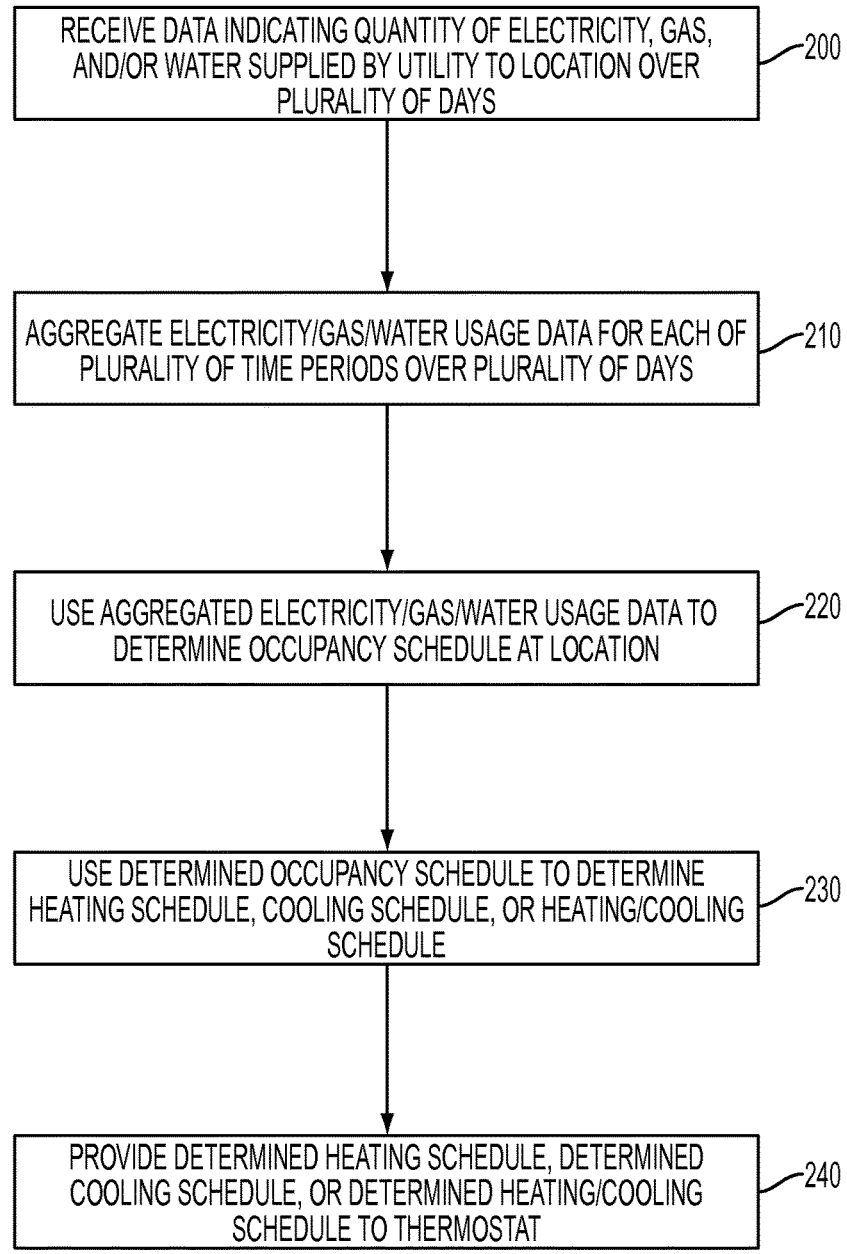
FIG. 2 is a flow diagram illustrating a process for determining a heating schedule, a cooling schedule, or a heating and cooling schedule and providing the determined schedule to a thermostat, according to an embodiment.

FIG. 2 is a flow diagram illustrating a process for determining a heating schedule, a cooling schedule, or a heating and cooling schedule and providing the determined schedule to a thermostat, according to an embodiment.

In block 200, resource usage data indicating a quantity of electricity, gas, and/or water supplied by a utility to a location over a plurality of days are received. The resource usage data may include sub-daily usage data that includes resource usage data for a plurality of time periods in a day. For example, resource usage data received may be subdivided into a quantity of electricity, gas, and/or water used during each hour of the day for a plurality of days. Alternatively, the resource usage data may be subdivided into smaller or larger time periods. For example, the sub-daily usage data may include resource usage data for each 15 minute interval, each 30 minute interval, or each 2 hour interval for a period of days. According to some embodiments the sub-daily usage data may include data associated with different time periods or non-regular intervals (e.g., a 15 minute time period, a 17 minute time period, etc.).

In block 210, the electricity, gas, and/or water usage data is aggregated over a plurality of days for each of a plurality of time periods. For example, if the usage data is subdivided into by hour of the day, mean or median usage may be determined for each hour of the day for the plurality of days. The mean or median usage may be determined separately for each type of day (e.g., day of the week, weekday or weekend, month of the year, holiday or non-holiday, peak-usage event, etc.). For example, mean or median usage may be determined separately for weekdays and weekends. According to other embodiments, the resource usage data may be aggregated by calculating a value for each time period based on the resource usage data for the time period. For example, the value for each time period may be calculated based on the mean or median usage for the time period.

In block 220, the aggregated electricity, gas, and/or water usage data is used to determine an occupancy schedule at the location. Various methods may be used to determine the occupancy schedule using the aggregated usage data from block 210, including but not limited to the archetype-based methods, neighbor-dependent methods, path dependent methods, and path independent methods that are described in detail below. As discussed above, the determined occupancy schedule may include various occupancy states that capture the modes in which a building may be occupied as well as times of day when the various occupancy states start and/or end. Additionally, as discussed above, the determined occupancy schedule may vary by type of day (e.g., day of the week, weekday or weekend, month of the year, holiday or non-holiday, peak-usage event, etc.) and reflect differing occupancy states and/or start times for the occupancy states.

Next, in block 230, the determined occupancy schedule is used to determine a heating schedule, a cooling schedule, or a heating and cooling schedule for the location. For example, a heating schedule may be determined in which different set points are associated with each of the occupancy states. In the example heating schedule shown in Table 1 below, a thermostat heating set point of 68° F. is associated with the "Wake_Up" and "Return_Home" occupancy states, a thermostat heating set point of 63° F. is associated with the "Go_To_Sleep" occupancy state, and a thermostat heating set point of 58° F. is associated with the "Leave_Home" occupancy state.

TABLE 1

| Occupancy State Start Time | Occupancy State | Thermostat Schedule Period Start Time | Thermostat Heating Set Point |
|---|---|---|---|
| 7:00 a.m. | Wake_Up | 7:00 a.m. | 68° F. |
| 7:45 a.m. | Leave_Home | 7:45 a.m. | 58° F. |
| 6:00 p.m. | Return_Home | 6:00 p.m. | 68° F. |
| 11:00 p.m. | Go_To_Sleep | 11:00 p.m. | 63° F. |

The schedule may be configured such that the start time for each thermostat schedule period is the same as the start time for each occupancy state, as shown in Table 1 above. Alternatively, as shown in Table 2 below, the schedule may be configured such that set points associated with certain occupancy states are set on the thermostat prior to the start time for the associated occupancy states, in order to allow the heating or cooling system time to heat or cool to the set point prior to the start of the occupancy state. In other words, the thermostat schedule period start time may be set prior to the occupancy state start time at least for certain occupancy states, such as the "Wake_Up" state and the "Return_Home" state. The thermostat schedule period start time may be set a predetermined amount of time before the occupancy state start time (e.g., 15 minutes prior), or the schedule period start time may be set based upon a calculated amount of time required for the heating or cooling system to heat or cool to the set point.

TABLE 2

| Occupancy State Start Time | Occupancy State | Thermostat Schedule Period Start Time | Thermostat Heating Set Point |
|---|---|---|---|
| 7:00 a.m. | Wake_Up | 6:45 a.m. | 68° F. |
| 7:45 a.m. | Leave_Home | 7:45 a.m. | 58° F. |
| 6:00 p.m. | Return_Home | 5:45 p.m. | 68° F. |
| 11:00 p.m. | Go_To_Sleep | 11:00 p.m. | 63° F. |

The thermostat set point temperatures assigned to each schedule period corresponding to each occupancy state may be based on preferences specified by a utility customer, tenant, occupant, or other energy user. Alternatively, the thermostat set point temperatures may be energy efficient set points specified by the utility or a third party.

Next, in block 240, the determined heating schedule, determined cooling schedule, or determined heating and cooling schedule is provided to the thermostat at the location. The schedule may be transmitted over a network to the thermostat directly or may be transmitted to a client device such as a smartphone or mobile device that may display the schedule and/or provide for updating a thermostat with the determined schedule. Alternatively, the determined schedule may be provided through a webpage that may display the schedule and/or provide for updating a thermostat with the determined schedule.

According to another embodiment, in block 230, instead of determining a heating schedule, a cooling schedule, or a heating and cooling schedule for the location, other types of schedules may be determined, including a lighting schedule, an irrigation system schedule, a security system schedule, or any other type of schedule. Likewise, in block 240, the determined schedule may be provided to a controller that controls the associated system. For example, a lighting schedule may be provided to a lighting system controller.

Figure 3:
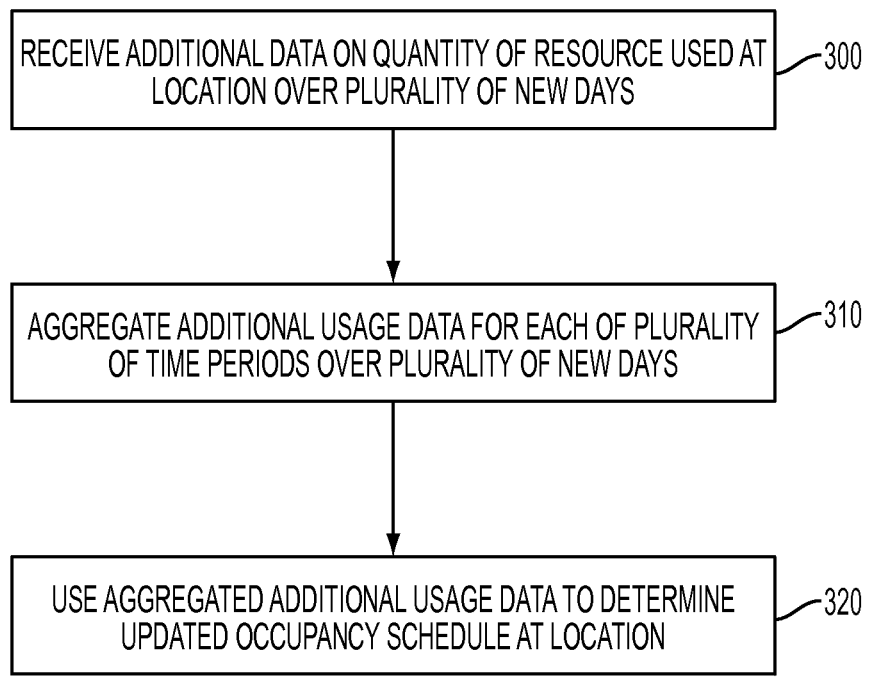
FIG. 3 is a flow diagram illustrating a process for determining an updated occupancy schedule at a location, according to an embodiment.

FIG. 3 is a flow diagram illustrating a process for determining an updated occupancy schedule at a location, according to an embodiment. As discussed above, an occupancy schedule for a location may change over time. For example, the occupancy schedule for a building that houses a business may change if the business's hours of operation change. Accordingly, the system may provide for determining an updated occupancy schedule based upon additional usage data. An updated occupancy schedule may be determined at periodic intervals, and/or may be determined upon a request from a utility, utility customer, energy user, or any other party. In other embodiments, the occupancy schedule may be determined on a rolling basis based on a most recent set of usage data.

Referring to FIG. 3, in block 300, additional data may be received on a quantity of one or more resources (e.g., electricity, gas, and/or water) used at the location over a plurality of new days. The usage data may include sub-daily usage data (i.e., usage data for a plurality of time periods each day, such as each hour of the day) for any resource that is correlated with occupancy, such as electricity, gas, or water.

In block 310, the received additional usage data is aggregated for each of the plurality of time periods over the plurality of new days. As discussed above, mean or median usage for each of the plurality of time periods (e.g., each hour of the day) over the plurality of new days may be used.

In block 320, the aggregated additional usage data is used to determine an updated occupancy schedule at the location and/or an updated heating schedule, an updated cooling schedule, or an updated heating and cooling schedule for the location, as described in detail below. Various methods may be used to determine the updated occupancy schedule using the aggregated additional usage data from block 310, including but not limited to the archetype-based methods, neighbor-dependent methods, path dependent methods, and path independent methods that are described in detail below. The determined updated occupancy schedule may include various occupancy states that capture the modes in which the building may be occupied as well as times of day when the various occupancy states start and/or end.

The updated occupancy schedule and/or an updated heating schedule, an updated cooling schedule, or an updated heating and cooling schedule for the location may be transmitted to the thermostat directly or may be transmitted to a client device such as a smartphone or mobile device that may display the updated schedule and/or provide for updating a thermostat with the updated schedule. Alternatively, the updated schedule may be provided through a webpage that may display the updated schedule and/or provide for updating a thermostat with the updated schedule.

Figure 4:
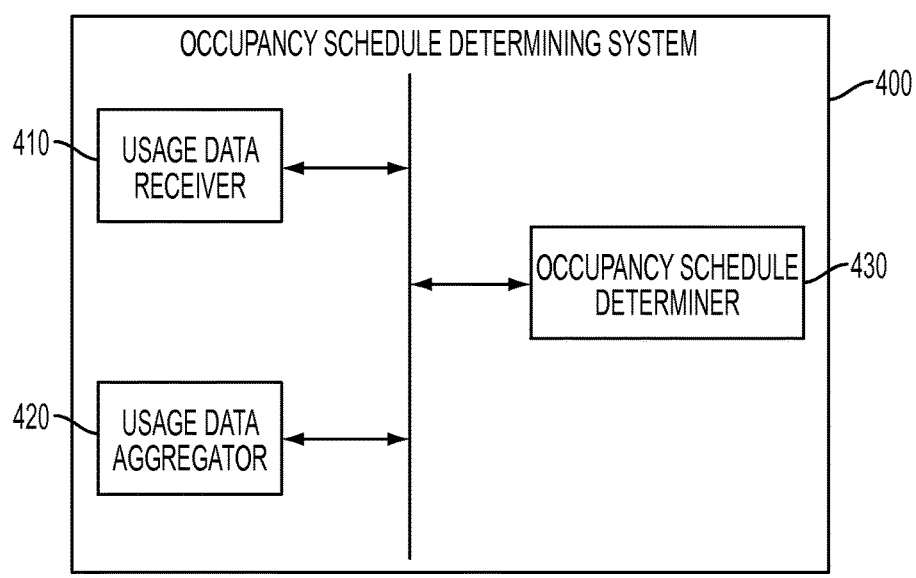
FIG. 4 is a block diagram illustrating an occupancy schedule determining system, according to an embodiment.

FIG. 4 is a block diagram that illustrates an embodiment of an occupancy schedule determining system 400 which includes a usage data receiver 410, a usage data aggregator 420, and an occupancy schedule determiner 430.

According to an embodiment, the usage data receiver 410 may receive usage data indicating a quantity of a resource supplied by a utility that is used at a location over a plurality of days, each of the plurality of days being subdivided into a plurality of predetermined time periods, and the usage data indicating the quantity of the resource supplied by the utility that is used during each of the predetermined time periods. The usage data aggregator 420 may aggregate the usage data for each of the plurality of predetermined time periods over the plurality of days. The occupancy schedule determiner 430 may use the aggregated usage data and the archetype-based methods, neighbor-dependent methods, path dependent methods, or path independent methods that are described in detail below to determine the occupancy schedule at the location. The usage data receiver 410, the usage data aggregator 420, and the occupancy schedule determiner 430 may be implemented as hardware modules or as software modules executed by one or more hardware processors.

According to some embodiments, the occupancy schedule determining system 400 may be implemented by one or more servers. In other embodiments, however, the occupancy schedule determining system 400 may be implemented by one or more client devices (e.g., a thermostat or a building interface device) or a combination of computing machines including a client device and a server.

Figure 5:
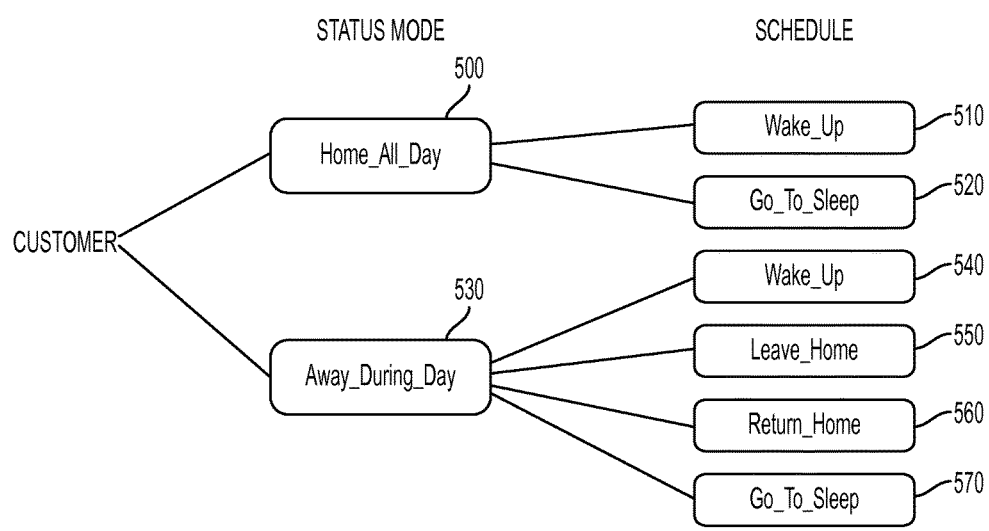
FIG. 5 is a diagram illustrating status modes and schedules corresponding to the status modes, according to an embodiment.

FIG. 5 is a diagram illustrating status modes and schedules corresponding to the status modes, according to an embodiment. The status modes shown in FIG. 5 represent occupancy paradigms having associated occupancy states and are determined and used in the hierarchical approaches to determining occupancy schedules that are discussed in detail below. For example, a "Home_All_Day" status mode may have "Wake_Up" and "Go_To_Sleep" as associated occupancy states, while an "Away_During_Day" status mode may have "Wake_Up," "Leave_Home," "Return_Home," and "Go_To_Sleep" as associated occupancy states. As discussed above, occupancy states reflect various modes in which a building may be occupied. These occupancy states may be hierarchical, archetypical, and change by the type of day.

A hierarchical set of occupancy states is one that includes status modes for occupying a building with a set of schedule states that goes with each status mode. For example, as illustrated in FIG. 5, a top-level status mode may be "Home_All_Day" 500 (i.e., the building is occupied during the day) or "Away_During_Day" 530 (i.e., the building is vacated during the day). Within each status mode there are certain associated schedule states (e.g., asleep, home, away, etc.) and/or schedule state changes. For example, status mode "Home_All_Day" 500 may have the associated schedule state changes of "Wake_Up" 510 and "Go_To_Sleep" 520, while "Away_During_Day" 530 may have the state changes "Wake_Up" 540, "Leave_Home" 550, "Return_Home" 560, and "Go_To_Sleep" 570. The hierarchical set of occupancy states illustrated in FIG. 5 is merely an example for illustrative purposes; there may be several hierarchies, each with several sets of schedule state changes, and these are not a comprehensive list of possible status modes or schedule state changes.

An archetypical occupancy schedule is a schedule that follows a general pattern that energy users are likely to emulate. Archetypical occupancy schedules are used in the archetype-based approaches to determining occupancy schedules that are discussed in detail below. A first example of an archetypical occupancy schedule is a stay at home schedule in which the usage curve is shaped like a sine curve. FIG. 6 is a diagram illustrating a usage curve 600 for an archetypical stay at home schedule, according to an embodiment. The usage curve indicates that resources are utilized throughout the typical "awake" times (e.g., 7:00 a.m. to 11:00 p.m.) and are less utilized during typical "sleep" times (e.g., 11:00 p.m. to 7:00 a.m.). A second example of an archetypical occupancy schedule is a nine-to-five archetype in which the usage curve is higher during the morning, lower during the day, and higher again during the evening. FIG. 7 is a diagram illustrating a usage curve 700 for an archetypical nine-to-five schedule, according to an embodiment. The archetypical nine-to-five schedule indicates increased resource usage in the morning (e.g., when users wake up), lower resource usage during the day (e.g., 9:00 a.m. to 5:00 p.m. working hours), increased resource usage again (e.g., when users return home from work), and another decrease in resource usage during typical "sleep" times. Other archetypical occupancy schedules may be used; the examples above are merely illustrative and not limiting.

Archetypical occupancy schedules may be determined using publicly available resources of daily energy usage, actual customer usage profiles, and/or guesses at what load curves may look like. Publicly available resources may include sources such as the Energy Information Administration (EIA), Independent Service Operators (ISOs), and Regional Transmission Organizations (RTOs).

Additionally, archetypical occupancy schedules may be determined using actual customer usage profiles. Examples of this include clustering load curves and using the resulting centroids as archetypes. K-means clustering may be used to determine archetypes, though other clustering algorithms may also be used. With k-means clustering, a number of archetypes is selected and the k-means algorithm discovers the centroids (archetypes) that best partition the given load curves into the chosen number of groups. The centers or medians of those groups (i.e., mean or median usage at each time interval for each group) are chosen as archetypes.

Algorithms such as principal component analysis (PCA) or singular value decomposition (SVD) may be used to reduce the dimensionality used in clustering. These reduced dimensionality features are then fed into the clustering algorithm instead of the load curve values. Algorithms such as self-organizing maps (SOM) may be used that achieve clustering and dimensionality reduction together.

The occupancy schedule state change times associated with an archetype may be chosen via known actual schedules that customers input. For a given archetype, an aggregated schedule state change time may be selected to represent the archetype. For example, the "Wake_Up" state change may be the average or median time of that state change for all customers with known schedules assigned to that archetype (e.g., 7:00 a.m.).

Alternatively, schedule times may be imputed by assigning times to a given archetype using intuition and/or publicly available data. For example, FIG. 8 is a diagram illustrating a usage curve 800 for an archetypical nine-to-five schedule and an imputed schedule, according to an embodiment. As shown in FIG. 8, the "Wake_Up" state change may be determined to occur at time point 810, the "Leave_Home" state change may be determined to occur at time point 820, the "Return_Home" state change may be determined to occur at time point 830, and the "Go_To_Sleep" state change may be determined to occur at time point 840. Additional state changes may also be identified.

Alternatively, occupancy state may be determined using an "open-ended" approach in which state changes would not have labels such as "Wake_Up," "Leave_Home," "Return_Home," or "Go_To_Sleep," as in the examples above. Instead, state changes may be identified without regard to a label or occupancy model. The system may attempt to identify a certain number of state changes or find the optimal number to fit the given load curve. This approach would help to identify actual occupancy patterns that differ from a user's stated occupancy state or find patterns that do not easily fit into a given set of predefined hierarchical occupancy states.

Occupancy schedules may be determined using archetype and neighbor-dependent approaches. To detect a user's schedule with a clustering approach is dependent on having known or imputed schedules for other users, or archetype schedules with associated inputs. The steps of a clustering approach are outlined below.

Archetype-based approaches use archetypes to determine occupancy schedules for users. A user's predicted schedule is the schedule associated with the archetype having a load curve that most closely matches the user's load curve.

A first archetype-based approach is a clustering with archetypes approach. In this approach, a user's load curve (generated using the user's resource usage data) is compared to load curves associated with known archetypes. The predicted schedule for the user is the schedule associated with the archetype load curve that most closely resembles the user's actual load curve. Specifically, according to an embodiment, the following steps may be performed to determine a user's predicted schedule according to this archetype-based approach:

For a user u:
1. Create a set of archetype load curves and associated schedule state changes as discussed above
    a. For each archetype load curve a, there will be a set of associated clustering inputs C (e.g., determined using PCA or SVD of load curve)
2. Compute the PCA or SVD of the load curve of u to match the clustering inputs C
    a. predictor inputs=f(load curve of u)
    b. Examples of f( ) may be PCA, SVD, no transformation, and/or a standardizing function
3. Score the predictor inputs from step (2) to determine the closest archetype. Scoring may be performed using the Euclidean distance between predictor inputs and clustering inputs C or other scoring functions (e.g., squared Euclidean distance between each input).
    a. For example, the archetype load curve having the minimum Euclidian distance between the clustering inputs C and the predictor inputs calculated using the load curve of u is determined to be the closest archetype.
4. The predicted schedule for user u is the representative schedule for the cluster (i.e., associated with the closest archetype), such as average or median schedule for the known schedules.

A second archetype-based approach is an archetype with a predictive model approach. In this approach, a predictive model or set of models is used to predict the archetype of a given user. The model is trained with predictor inputs of users with known schedules and an associated archetype. For example, the model may determine predictor inputs for an archetype load curve by performing PCA or SVD on load curves of users having known schedules corresponding to the archetype. Users with known schedules may be associated with an archetype manually or with an approach such as the clustering with archetypes approach discussed previously. Specifically, according to an embodiment, the following steps may be performed to determine a user's predicted schedule according to this archetype with a predictive model approach:

For a user u:
1. Create a data set of archetype load curves and associated schedule state changes using an approach discussed above
2. Create the predictor inputs for the archetype load curves
    a. For each archetype load curve a:
        i. predictor inputs_a=f(load_curve_a)
        ii. Examples off( ) may be PCA, SVD, no transformation, and/or a standardizing function 3. Apply the same predictor input function to the load curve of u
   a. predictor_inputs_u=f(load_curve_u)
4. Create a set of models for each archetype a
   a. likelihood(a)=f(predictor_inputs_u)
   b. Each model will predict the likelihood of being associated with the given archetype
   c. Examples are: logistic regression, ensemble methods, or a neural network
   d. Each model may also include regularization (such as a logistic Lasso)
5. For each model a, score the predictor_inputs_u against the A model outputs
6. The predicted schedule for user u are the schedule times associated with the archetype model with the highest likelihood
   a. max(likelihood(A))

The archetypes with a predictive model approach may also be modified to work with nearest neighbor or similar predictive models. Specifically, according to an embodiment, the following steps may be performed to determine a user's predicted schedule according to an archetype-based approach using the k-nearest neighbor model:

For a user u:
1. Create a data set of archetype load curves and associated schedule state changes using an approach discussed above
2. Create the predictor inputs for the archetype load curves
   a. For each archetype a:
      i. predictor inputs_a=f(load_curve_a)
      ii. Examples of f( ) may be PCA, SVD, no transformation, and/or a standardizing function
3. Apply the same predictor input function to the load curve of u
   a. predictor_inputs_u=f(load_curve_u)
4. Create a single model for all archetypes
5. Calculate the k nearest neighbors using a distance function on the predictor_inputs
6. The predicted schedule for user u, are the schedule times associated with the majority vote wining archetype from the k neighbors
   a. For example, if a user's five nearest neighbors are ["Nine-to-Five", "Home-During-Day", "Nine-to-Five", "Nine-to-Five", "Home-During-Day"], the predicted schedule is that of the "Nine-to-Five" archetype because there are three neighbors with "Nine-to-Five" archetypes and two neighbors with the "Home-During-Day" archetype
   b. This algorithm may be extended to handle ties in the majority voting step Alternatively, neighbor-dependent approaches may be used to determine occupancy schedules for users. A first neighbor-dependent approach is a user specific representative schedule approach. This class of approaches is similar to the archetypes with a predictive model approach, but there will be more differentiation in the predicted schedule. The predicted schedule is derived from the known schedules of similar users by explicitly modeling each schedule state change time as opposed to an overall archetype. Specifically, according to an embodiment, the following steps may be performed to determine a user's predicted schedule according to the user specific representative schedule approach:

For a user u:
1. Create a data set of known schedules and load curves associated with the known schedules to use in the algorithm
2. Calculate the predictor inputs for the load curves associated with the known schedules
   a. For each known user k:
      i. predictor inputs_k=f(load curve_k)
      ii. Examples of f( ) may be PCA, SVD, no transformation, and/or a standardizing function
3. Apply the same predictor input function to the load curve of u
   a. predictor_inputs_u=f(load_curve_u)
4. Create a set of models of schedule state change times using the K sets of predictor inputs
   a. Examples include linear regression, neural networks, or ensemble methods
   b. There will be S models, one for each state change (e.g., a schedule with only wake and sleep state changes will have two models)
5. For each model s, score predictor_inputs_u against the S model outputs
6. The predicted schedule state change times for user u are the outcomes of the score step The user specific representative schedule approach may be modified to work with nearest-neighbor or similar predictive models. Specifically, according to an embodiment, the following steps may be performed to determine a user's predicted schedule according to the user specific representative schedule approach using the k-nearest neighbor model:

For a user u:
1. Create a data set of known schedules and load curves associated with the known schedules to use in the algorithm
2. Calculate the predictor inputs for the load curves associated with the known schedules
   a. For each known user k:
      i. predictor inputs_k=f(load curve_k)
      ii. Examples of f( ) may be PCA, SVD, no transformation, and/or a standardizing function
3. Apply the same predictor input function to the load curve of u
   a. predictor_inputs_u=f(load_curve_u)
4. Create a single model for all state changes
5. Calculate the k nearest neighbors using a distance function on the predictor_inputs
6. The predicted schedule state changes are a function of state changes of the k nearest neighbors
   a. Example: Each state change time=average(state_change) of the k nearest neighbors Instead of using the archetype and neighbor-dependent approaches described above, occupancy schedules may also be determined using hierarchical approaches. These approaches are used to predict schedules given an assumed hierarchical schedule. An assumed hierarchical schedule may be appropriate if a system is has specific operating modes or types of state changes.

A first hierarchical approach is a path dependent approach that first predicts top hierarchy layers and then predicts schedule state changes. A path dependent approach prunes the possible outcomes as each successive layer of the hierarchy is predicted. The examples assume a two layer hierarchy or mode and schedule as illustrated in FIG. 5. This approach may be generalized to apply to hierarchies with more layers or nodes within each layer.

In this example we have one layer of schedule state changes ("Schedule" in FIG. 5) and one top layer ("Status Mode" in FIG. 5). This approach involves moving down the hierarchy by predicting the most likely node in each layer, pruning the other nodes with each step.

For example, the hierarchy illustrated in FIG. 5 has two possible Status Modes: "Home_All_Day" 500 and "Away_During_Day" 530. For a given user, the most likely status mode is predicted, and then the associated schedule state change times for that mode are solved for. The other status modes and associated state changes are discarded.

Figure 9:
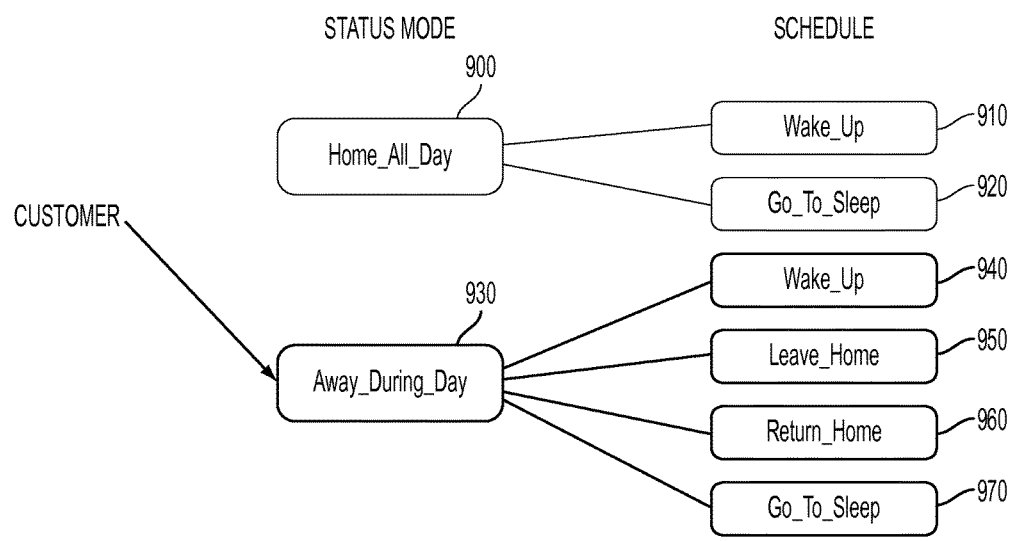
FIG. 9 is a diagram illustrating schedules corresponding to a predicted "Away_During_Day" status mode, according to an embodiment.

FIG. 9 is a diagram illustrating schedules corresponding to a predicted "Away_During_Day" 930 status mode, according to an embodiment. As illustrated in FIG. 9, "Away_During_Day" 930 is deemed the more likely status mode. The algorithm then ignores the other status mode ("Home_All_Day" 900) and its associated schedule ("Wake_Up" 910 and "Go_To_Sleep" 920), solving only for the four schedule state change times associated with "Away_During_Day" 930 (i.e., "Wake_Up" 940, "Leave_Home" 950, "Return_Home" 960, and "Go_To_Sleep" 970).

In the example illustrated in FIG. 9, there is one top layer ("Status Mode"), however, predications may be made for multiple top hierarchy layers such as ["Business", "Residence"] and ["High Usage", "Medium Usage", "Low Usage"].

A first approach to predicting top hierarchy layers is an unsupervised clustering approach. Specifically, according to an embodiment, unsupervised clustering algorithms may be used to divide users with known schedules by the values of their predictor inputs as follows:

For a given layer with N nodes,
1. Create a data set of known schedules and load curves associated with the known schedules to use in the algorithm
2. Calculate the predictor inputs for the load curves associated with the known schedules
    a. For each known user k:
        i. predictor inputs_k=f(load curve_k)
3. Apply the same predictor input function to the user's load curve
    a. predictor_inputs_u=f(load_curve_u)
4. Use a clustering algorithm, such as k-means, to create [N, K) clusters of the K sets of predictor inputs
    a. i.e., at least N but fewer than K
    b. The number of clusters may be chosen based on prior knowledge or analytically with a method such as the Gap statistic
5. Assign each resulting cluster to a node
    a. One assignment method is majority voting within each cluster
    b. With fewer clusters there will be more overlap within each cluster, leading to lower predictive power
6. Assign the user to the cluster that most closely fits the user's predictor_inputs
7. A user's predicted node is the node associated with the closest cluster
8. Move to the next layer An alternative to the above approach is to first group by the known node before splitting into clusters. Steps (4) and (5) are swapped, thereby guaranteeing that there will not be any representation from other nodes within a given node's clusters. The downside to this approach is there may be similar clusters in different nodes. However, this is not any worse than the previous algorithm.

A second approach to predicting top hierarchy layers is a supervised prediction approach. This approach utilizes the known hierarchy statuses to model each node's likelihood. Specifically, according to an embodiment, the following steps may be performed to predict top hierarchy layers according to the supervised prediction approach:

For a given layer with N nodes,
1. Create a data set of known hierarchical schedules and load curves to use in the algorithm
2. Calculate the predictor inputs for the load curves associated with with known schedules
    a. For each known user k:
        i. predictor inputs_k=f(load curve_k)
3. Apply the same predictor input function to the load curve of the user u
    a. predictor_inputs_u=f(load_curve_u)
4. Model the likelihood of each node
    a. For each node n:
        i. Model the likelihood of node n as a function of the predictor_inputs_K
        ii. pr(n)=f(predictor_inputs_K)
    b. Example models are logistic regression, logistic Lasso, neural networks, or ensemble predictors
5. Calculate the likelihood of each node n for user u
6. The predicted node is the node with the highest likelihood given the user's predictor_inputs_u A regularization term may be included in each step that penalizes nodes that are considered a priori to be less likely. Nodes may be considered a priori less likely based on survey data, publicly available data on energy usage patterns, or actual schedules set by users.

The penalty function penalizes less likely nodes, pushing the algorithm towards more likely nodes. An example penalty function may take the form of inverse proportion of users with a given node, but other functions may also be used.

Example

1. For each node, n
penalty_n=1/(count(n)/N)

The supervised prediction approach may be modified to take advantage of k-nearest-neighbor type algorithms that do not require separate models for each node in a given layer. Specifically, according to an embodiment, the following steps may be performed:
1. Create a data set of known hierarchical schedules and load curves associated with the known schedules to use in the algorithm
2. Calculate the predictor inputs for the load curves associated with the known schedules
    a. For each known user k:
        i. predictor inputs_k=f(load curve_k)
3. Apply the same predictor input function to the load curve of user u
    a. predictor_inputs_u=f(load_curve_u)
4. Create a single model of all node likelihoods
5. Calculate the k nearest neighbors for the user's inputs by comparing predictor_inputs_K to predictor_inputs_u
    a. Any distance function may be used; Euclidean distance may be used as a default
6. The predicted node for user u is a function of the k nearest neighbors
    a. Majority voting may be used as a default function In the path dependent hierarchical approach, after the top hierarchy layers are predicted, schedule state changes are predicted next. By predicating all the top-layer nodes, the field of possible schedule state changes is narrowed to those associated with the given branch of the tree hierarchy. For example, as illustrated in FIG. 9, four schedule state changes are associated with "Away_During_Day" 930: "Wake_Up" 940, "Leave_Home" 950, "Return_Home" 960, and "Go_To_Sleep" 970.

A prediction model may be used to model each schedule state change within a given tree hierarchy. Specifically, according to an embodiment, the following steps may be performed to model each schedule state change:

For a user u:
1. Create a dataset of users with identical top-layers to those predicted for user u in previous steps
2. Calculate the predictor inputs for the load curves associated with known schedules
   a. For each known user with identical hierarchical schedules hk:
      i. predictor inputs_hk=f(load curve_hk)
3. Apply the same predictor input function to the load curve of u.
   a. predictor_inputs_u=f(load_curve_u)
4. Model the state change time for each state change in the schedule
   a. For each s:
      i. s=f(predictor_inputs_HK)
      ii. Example models are linear regression, neural network, or ensemble methods
5. Score the user's predictor_inputs_u against the model in step (4)
   a. For each s:
      i. s_u=f(predictor_inputs_u)
6. The predicted schedule state change times for user u are the results of the scoring step (5)

The prediction model used to model each schedule state change within a given tree hierarchy as discussed above discards schedule state change times of users with different hierarchical nodes than those predicted for a given user. The algorithm is parsimonious and removes the influence of radically different types of schedules (e.g., schedules of night shift workers). The downside is that there may be useful information in other nodes that the algorithm cannot take advantage of.

An alternative approach is to use a prediction model with node likelihoods as predictors to model each schedule state change within a given hierarchy tree. The schedule state change time may be modeled as an explicit function of the likelihood of each node. Nodes with lower likelihoods will have a small effect on the predicted schedule state change time, while nodes with higher likelihoods will have a greater effect on the predicted schedule state change time. The state change prediction may be improved according to this approach if there are multiple nodes with relatively similar likelihoods, as all will be represented in the final state change prediction, not just the node with the highest rank order. Specifically, according to an embodiment, the following steps may be performed to model each schedule state change:

For a user u:
1. Create a data set of known hierarchical schedules and load curves associated with the known schedules to use in the algorithm
2. Calculate the predictor inputs for the load curves associated with known schedules.
   a. For each known user k:
      i. predictor inputs_k=f(load curve_k)
3. Apply the same predictor input function to the load curve of u
   a. predictor_inputs_u=f(load_curve_u)
4. Model the state change time for each schedule state change
   a. For each schedule state change s:
      i. Model the state change time s as a function of the predictor_inputs_K and variables representing the actual nodes
         1. For example, a node binary variable for "Home_All_Day", HAD_node, will take the value 1 if the user has selected that node and 0 if not
      ii. s=f(predictor_inputs_K, node settings)
   b. Example models are linear regression, Lasso, neural network, and ensemble methods
5. Calculate the predicted state change times for the user
   a. predicted s_u=f(predictor_inputs_u, node likelihoods)
   b. For example, if a user is predicted to have 66% chance of having a Home_All_Day status, the HAD_node variable will have the value 0.66
6. The predicted state change times are the calculations from step (5)

The above algorithm may be implemented with a simple model, such as a linear regression. Alternatively, a multilevel or hierarchical model may be used. Multilevel models allow parameters to vary for multiple levels, making use of the entire dataset (e.g., all users, regardless of each node's setting) in addition to more similar subsets (e.g., users with only a "Home_All_Day" setting).

Alternatively, a change point detection approach may be used to model each schedule state change within a given tree hierarchy. The change point detection approach may be used to detect schedule state changes in a time series. A change point detection approach is independent of other users' data and may be applied without any prior training of the model. However, trying different change point algorithms may help to find a particular algorithm and tuning that best predicts schedule state changes, since there are a variety of algorithms with different tuning parameters for each. Specifically, according to an embodiment, the following steps may be performed to model each schedule state change according to the change point detection approach:

For a user u:
1. Select a change point algorithm that allows you to select the number of state changes to find S
   a. An example is a Hidden Markov Model with S+1 states
2. Calculate the user's load curve, load_curve_u
   a. This may be raw data or aggregated as previously discussed
3. Apply the change point algorithm to load_curve_u
4. Determine the S most likely change point times
5. The user's set point state change times are a function of the S most likely change point times
   a. The derived state changes may be fit to the hierarchical schedule in an intelligent way, through rules or algorithms that match the derived state change times to state change labels deemed a priori likely
      i. Example rule: For "Wake" and "Sleep" state changes, the "Wake" state change is the one nearest 8:00 a.m.
      ii. Example algorithm: Assign the "Wake" and "Sleep" labels such that it minimizes the distance between the average "Sleep" and "Wake" times A second hierarchical approach to determining occupancy schedules is to use a path independent method, as opposed to a path dependent method as described above. In contrast to the path dependent methods, path independent methods attempt to find the optimal number of schedule state changes, which are then fit to the closest matching hierarchy.

A first path independent method is an iterative change point approach. Specifically, according to an embodiment, the following steps may be performed to determine a user's predicted schedule according to the iterative change point approach:

For a user u:
1. Select a change point algorithm that allows you to select the number of state changes to find, S
   a. An example is a Hidden Markov Model with S+1 states
2. Calculate the user's load curve, load_curve_u
   a. This may be raw data or aggregated as previously discussed
3. For s in Min_s . . . Max_s:
   a. Apply the change point algorithm to load_curve_u
   b. Apply a penalty function proportional to the number of states, s
      i. The penalty function is meant to penalize models with a greater number of states to prevent overfitting
      ii. Example penalty functions are Akaike Information Criterion (AIC) or Bayesian Information Criterion (BIC)
   c. Min_s and Max_s are determined ahead of time and are defined by the number of state changes in all hierarchies
      i. The "Away_During_Day" mode has four state changes and "Home_During_Day" mode has two.
4. Select the number of states with the maximum penalized likelihood
   a. predicted_s=min(penalized likelihood)
5. The user's set point state change times are a function of the predicted_s state changes
   a. The derived state changes may be fit to the hierarchical schedule in an intelligent way, through rules or algorithms that match the derived state change times to state change labels deemed a priori likely
      iii. Example algorithm:
         1. Find all hierarchy branches with predicted_s schedule state changes
         2. Select the hierarchy branch that minimizes the distance from the average state change times in that branch and any ordering of the predicted_s state changes
         3. Assign the user to the chosen hierarchy branch, matching the predicted_s state changes to the ordering that minimizes the distance from the branch averages A penalty function may be implemented to penalize schedules deemed a priori to be less likely. The penalty function may be used while determining the optimal number of states (step (3)) or when matching the predicted_s state changes to a hierarchy branch (step (5)). An example penalty function is the inverse proportion of users with chosen schedules. The actual penalty function may take any form and may be informed by actual schedule settings, public data from sources like the EIA or surveys.

A second path independent method is a change point with optimal number of states approach. In contrast to the iterative change point approach, the change point algorithm may internally determine the optimal number of change points. The resulting algorithm is simpler because it does not include the iterative procedure to determine the optimal number of states. Specifically, according to an embodiment, the following steps may be performed to determine a user's predicted schedule according to the change point with optimal number of states approach:

For a user u:
1. Select a change point algorithm that optimally determines the number of state changes, S
   a. Examples are adaptive weight smoothing, circular binary segmentation, and second derivative algorithms
2. Calculate the user's load curve, load_curve_u
   a. This may be raw data or aggregated as previously discussed
3. Apply the change point algorithm to load_curve_u
4. The user's set point state change times are a function of the predicted_s state changes
   a. The derived state changes may be fit to the hierarchical schedule in an intelligent way, through rules or algorithms that match the derived state change times to state change labels deemed a priori likely
      i. Example algorithm:
         1. Find all hierarchy branches with predicted_s schedule state changes
         2. Select the hierarchy branch that minimizes the distance from the average state change times in that branch and any ordering of the predicted_s state changes
         3. Assign the user to the chosen hierarchy branch, matching the predicted_s state changes to the ordering that minimizes the distance from the branch averages According to yet another embodiment, instead of using the archetype and neighbor-dependent approaches or hierarchical approaches described above, occupancy schedules may also be determined using open ended approaches. Open ended approaches have less structure than the previously discussed approaches. The path independent methods may be classified as open ended approaches if the last step from each (step (5) from the iterative change point approach and step (4) from the change point with optimal number of states approach) is removed. These methods find the optimal number of change points in a home and then try to fit them to a hierarchy.

Without the last step, relatively pure change points may be identified that may be used to determine if a user's stated schedule differs from the predicted schedule or to find additional archetypes or hierarchies. The open ended approaches may be incorporated into other the previously discussed methods, as with the path independent methods. For example, an open ended approach may be used to fit to an archetype instead of a hierarchy.

According to another embodiment, the approaches described above may be modified to use other input data in addition to or instead of the load cure data. For example, other known, calculated, or imputed property or geographic characteristics may be used, including the number of occupants at a location; owner-occupied, single- or multi-family residence status; presence of a pool; heat system type; etc. These characteristics may be used directly in the algorithms (e.g., as inputs in a regression model), or in pre-processing steps (e.g., to segment properties, to transform the load curve, or inputs to dimensionality reduction algorithms).

According to yet another embodiment, depending on the approach, pre-processing may be performed on the input data so that the input data is standardized to have a constant mean or standard deviation. This may be useful in group-level algorithms such as clustering, since magnitudes will be highly variable between buildings. Dimensionality may also be reduced in this step to extract the most representative features. Examples of dimensionality reduction include principle component analysis (PCA) and singular value decomposition (SVD). The outcomes of the pre-processing step are the "predictor inputs," and may include any or all of the data discussed. Signal filtering may be performed using a Gaussian filter or Fourier transform.

Although some embodiments described above use resource usage data for one kind of resource (e.g., electricity), in other embodiments resource usage data for a number of different resources (e.g., a combination including electricity, network bandwidth, water, and/or gas) may also be used to determine an occupancy schedule for a building or location.

Figure 10:
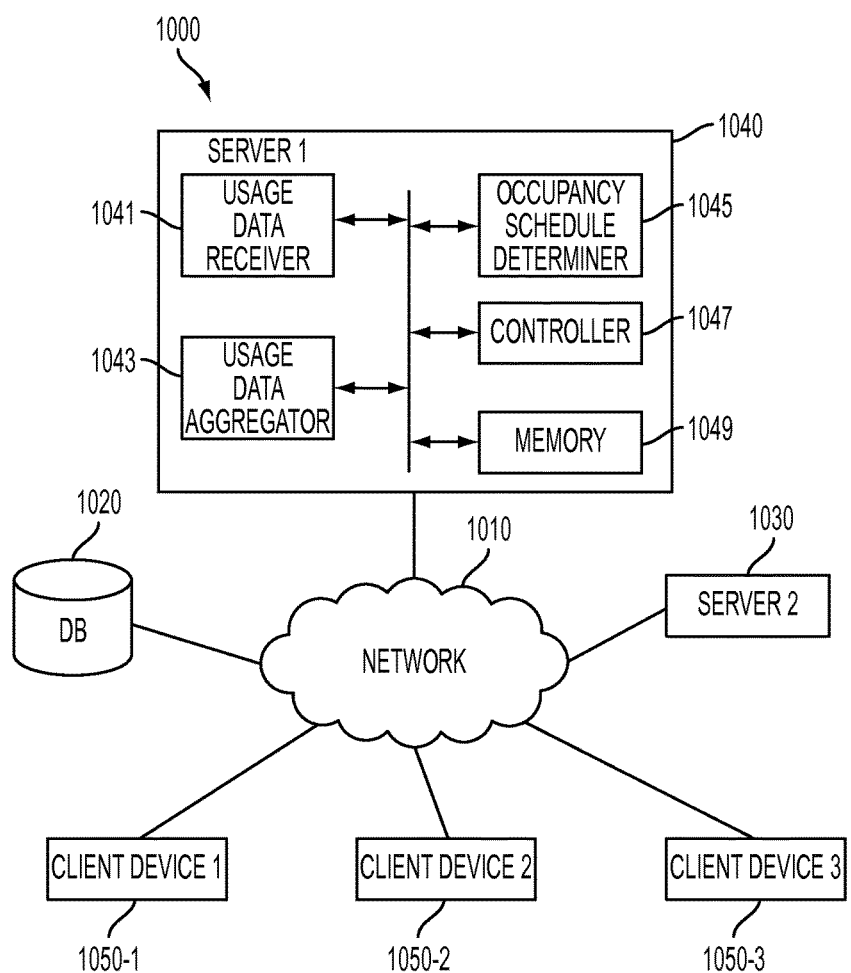
FIG. 10 is a block diagram that illustrates an embodiment of a network including servers upon which the system may be implemented and client devices that communicate with the servers, according to an embodiment.

FIG. 10 is a block diagram that illustrates an embodiment of a network 1000 including servers 1030, 1040 upon which the system may be implemented and client devices 1050-1, 1050-2, 1050-3 that communicate with the servers 1030, 1040. The client devices 1050-1, 1050-2, 1050-3 will be described in greater detail below with reference to FIG. 11. Server 1 1040 includes a usage data receiver 1041, a usage data aggregator 1043, an occupancy schedule determiner 1045, a controller 1047, and a memory 1049. The usage data receiver 1041, the usage data aggregator 1043, the occupancy schedule determiner 1045, and the controller 1047 may include at least one of a processor, a hardware module, or a circuit for performing their respective functions. Although not illustrated, server 2 1030 may be similarly embodied. The client devices 1050-1, 1050-2, 1050-3 may communicate across the Internet or another wide area network (WAN) or local area network (LAN) 1010 with server 1 1040 and server 2 1030. Server 1 1040 and server 2 1030 may also communicate with database 1020 across the Internet or another wide area network (WAN) or local area network (LAN) 1010.

The usage data receiver 1041, the usage data aggregator 1043, the occupancy schedule determiner 1045, the controller 1047, and the memory 1049 operate to execute instructions, as known to one of skill in the art. The term "computer-readable storage medium" as used herein refers to any tangible medium, such as a disk or semiconductor memory, that participates in providing instructions to the usage data receiver 1041, the usage data aggregator 1043, the occupancy schedule determiner 1045, or the controller 1047 for execution.

According to an embodiment, one or both of server 1 1040 and server 2 1030 may implement the occupancy schedule determining system. For example, server 2 1030 may be located at a utility company, a third-party site, or any other location and be configured to receive information regarding resource usage by a plurality of utility customers over a plurality of days. Sever 2 1030 may communicate with or otherwise receive information from the database 1020 or another internal or external data source or database in the process of receiving information regarding resource usage by the plurality of utility customers. Server 2 1030 may aggregate the resource usage data for each of a plurality of time periods over the plurality of days. Server 2 1030 may usage the aggregated resource usage data to determine an occupancy schedule at a location and/or a heating schedule, cooling schedule, or heating and cooling schedule. The determined occupancy schedule and/or determined heating schedule, cooling schedule, or heating and cooling schedule may be provided to client devices 1050-1, 1050-2, 1050-3 and/or stored in the database 1020. The determined occupancy schedule and/or determined heating schedule, cooling schedule, or heating and cooling schedule may be communicated to sever 1 1040.

Server 1 1040 may receive data on a quantity of a resource used at a location over a plurality of days, aggregate usage data for each of a plurality of time periods over the plurality of days, and use the aggregated usage data to determine an occupancy schedule at the location and/or a heating schedule, cooling schedule, or heating and cooling schedule. Server 1 1040 may provide the determined occupancy schedule and/or determined heating schedule, cooling schedule, or heating and cooling schedule to client devices 1050-1, 1050-2, 1050-3, and/or store the determined schedule in a database. However, this is merely exemplary and the system may be implemented on a single server or on more than two servers. Further, the database 1020 may be optionally omitted. Various functions may be performed on separate servers.

Figure 11:
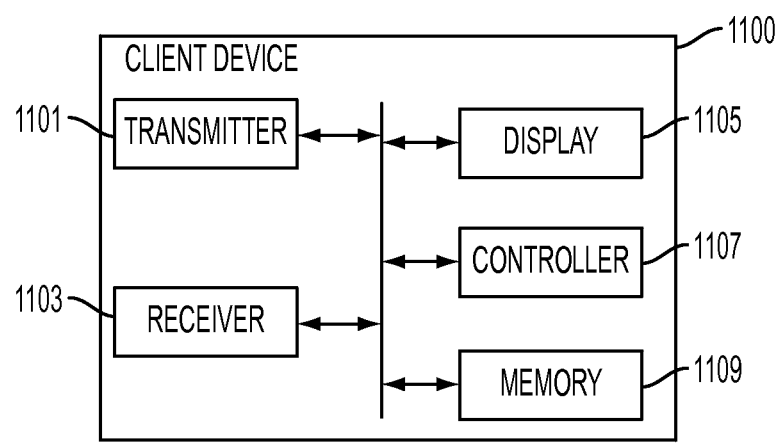
FIG. 11 is a block diagram illustrating a client device, according to an embodiment.

FIG. 11 is a block diagram that illustrates an embodiment of a client device 1100 which may receive information about a determined occupancy schedule and/or a determined heating schedule, cooling schedule, or heating and cooling schedule. The client device 1100 includes a transmitter 1101, a receiver 1103, a display 1105, a controller 1107, and a memory 1109. The transmitter 1101 may be configured to transmit information to server 1 1040 and/or server 2 1030. The receiver 1103 may be configured to receive, from server 1 1040 and/or server 2 1030, information regarding the determined occupancy schedule and/or the determined heating schedule, cooling schedule, or heating and cooling schedule.

The controller 1107 and the memory 1109 operate to execute instructions, as known to one of skill in the art. The controller 1107 may include at least one of a processor, a hardware module, or a circuit for performing its respective functions. The display 1105 may be configured to display the received information. Further, the display 1105 may be a touchscreen display and may act as an input device for interacting with a utility customer or other user. The client device 1100 may connect to the network 1010 using wireless protocols, such as 802.11 standards, Bluetooth®, or cellular protocols, or via physical transmission media, such as cables or fiber optics.

The client device 1100 may be embodied in many different forms such as a smartphone, a mobile device, a thermostat, a computer, a device having a graphical UI (GUI) from which a thermostat set point can be selected or adjusted, etc. The GUI may be accessed through an application installed on a utility customer's smartphone or through a browser displaying the utility customer's utility account. Therefore, a utility customer may be able to view information about the determined occupancy schedule and/or the determined heating schedule, cooling schedule, or heating and cooling schedule, modify the schedules, and/or remotely control their thermostat.

According to various embodiments, the system may also select content (e.g., energy saving tips, promotions, advertisements, information about utility services or programs, etc.) to provide to users based on their occupancy schedule and transmit the selected content to users. According to various embodiments, the system may use the occupancy schedule to calculate and manage demand response programs. For example, the system may determine that a user is not a good candidate to enroll in a demand response program because the user is not at home during peak events when a demand response event would be called. Alternatively, where the system is configured to control resource consuming devices at the user's home, the system may more aggressively reduce resource consumption during peak events if the user is not at home.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for determining a predicted user schedule at a location wherein the method is performed by a computing system including at least a processor for executing instructions, the method comprising:

receiving, by at least the processor, usage data indicating a quantity of a resource supplied by a utility that is used at the location over a plurality of days;

aggregating, by at least the processor, the usage data for each of a plurality of predetermined time periods subdivided from the plurality of days;

generating, by at least the processor using the aggregated usage data, a load curve that represents variations in usage of the quantity of the resource over the plurality of days;

creating, by at least the processor, a set of load curves based upon customer usage profiles of a plurality of customers, wherein the set of load curves have a set of clustering inputs derived from state changes within the set of load curves;

computing, by at least the processor, predictor inputs of the load curve, wherein the predictor inputs are derived from state changes within the load curve;

comparing, by at least the processor, distances between the predictor inputs derived from the state changes within the load curve to the set of clustering inputs derived from state changes within the set of load curves to identify a target load curve within the set of load curves that closest matches the load curve, wherein the comparing comprises scoring predictor inputs based upon Euclidean distances between the predictor inputs and the set of clustering inputs, wherein the target load curve is identified based upon the target load curve having a score corresponding to a minimum Euclidean distance;

generating, by at least the processor, a predicted user schedule based upon an occupancy schedule assigned to the target load curve; and controlling, by at least the processor, settings of a thermostat using a heating schedule, a cooling schedule, or a heating and cooling schedule generated using the predicted user schedule.

2. The method of claim 1, further comprising:

determining a time at which a peak event of a demand response event will occur;

responsive to determining that the time corresponds to a time at which the user will not be occupying the location as indicated by the occupancy schedule, determining that the user is a candidate to enroll in the demand response event; and responsive to determining that the time corresponds to a time at which the user will be occupying the location as indicated by the occupancy schedule, determining that the user is not a candidate to enroll in the demand response event.

3. The method of claim 1, wherein the computing predictor inputs comprise computing the predictor inputs derived from state changes comprising at least one of a wake up state change, a leave home state change, a return home sleep state change, or a go to sleep state change.

4. The method of claim 3, wherein the providing the predicted user schedule at the location to the system controller comprises providing the predicted user schedule at the location to the thermostat that controls a heating system, a cooling system, or a heating and cooling system at the location.

5. The method of claim 1, wherein the predicted user schedule indicates time periods when the location is predicted to be occupied and time periods when the location is predicted to be unoccupied.

6. The method of claim 1, further comprising:

receiving additional usage data indicating a second quantity of the resource supplied by the utility that is used at the location over a plurality of new days, each of the plurality of new days being subdivided into the plurality of predetermined time periods;

aggregating the additional usage data for each of the plurality of predetermined time periods over the plurality of new days; and using the aggregated additional usage data to update the predicted user schedule at the location.

7. A non-transitory computer readable medium storing a program of instructions that when executed by at least a processor of a computing device causes the processor to:

receive, by the processor, usage data for a resource that is used at a location over a plurality of days;

aggregate, by the processor, the usage data for each of a plurality of predetermined time periods subdivided from the plurality of days;

generate, by at least the processor using the aggregated usage data, a load curve that represents variations in usage of the quantity of the resource over the plurality of days;

create, by at least the processor, a set of load curves based upon customer usage profiles of a plurality of customers, wherein the set of load curves have a set of clustering inputs derived from state changes within the set of load curves;

compute, by at least the processor, predictor inputs of the load curve, wherein the predictor inputs are derived from state changes within the load curve;

compare, by at least the processor, distances between the predictor inputs derived from the state changes within the load curve to the set of clustering inputs derived from state changes within the set of load curves to identify a target load curve within the set of load curves that closest matches the load curve, wherein the comparing comprises scoring predictor inputs based upon Euclidean distances between the predictor inputs and the set of clustering inputs, wherein the target load curve is identified based upon the target load curve having a score corresponding to a minimum Euclidean distance;

generate, by at least the processor, a predicted user schedule based upon an occupancy schedule assigned to the target load curve; and control, by at least the processor, settings of a thermostat using a heating schedule, a cooling schedule, or a heating and cooling schedule generated using the predicted user schedule.

8. The non-transitory computer readable medium of claim 7, wherein the receiving the usage data comprises receiving data indicating the quantity of at least one of electricity, gas, or water supplied by a utility resource provider to the location over the plurality of days.

9. The non-transitory computer readable medium of claim 7, further comprising instructions that when executed by the processor cause the processor to:

provide the predicted user schedule at the location to a system controller that controls a system at the location.

10. The non-transitory computer readable medium of claim 9, wherein the providing the predicted user schedule at the location to the system controller comprises providing the predicted user schedule at the location to the thermostat that controls a heating system, a cooling system, or a heating and cooling system at the location.

11. The non-transitory computer readable medium of claim 7, wherein the predicted user schedule indicates time periods when the location is predicted to be occupied and time periods when the location is predicted to be unoccupied.

12. The non-transitory computer readable medium of claim 7, further comprising instructions that when executed by the processor cause the processor to:

receive additional usage data indicating a second quantity of the resource that is used at the location over a plurality of new days, each of the plurality of new days being subdivided into the plurality of predetermined time periods;

aggregate the additional usage data for each of the plurality of predetermined time periods over the plurality of new days and generate a second load curve; and using the second load curve to update the predicted user schedule at the location.

13. A system for determining an occupancy schedule at a location, the system comprising:

at least one processor connected to at least one memory;

a usage data receiver that receives, by network communications, usage data of a resource that is used at the location over a plurality of days;

a usage data aggregator implemented with instructions that when executed by at least the one processor cause the at least one processor to aggregate the usage data for each of a plurality of predetermined time periods subdivided from the plurality of days; and an occupancy schedule determiner implemented with instructions that when executed by at least the one processor cause the at least one processor to:

generate, using the aggregated usage data, a load curve that represents variations in usage of the quantity of the resource over the plurality of days;

create a set of load curves based upon customer usage profiles of a plurality of customers, wherein the set of load curves have a set of clustering inputs derived from state changes within the set of load curves;

compute predictor inputs of the load curve, wherein the predictor inputs are derived from state changes within the load curve;

compare distances between the predictor inputs derived from the state changes within the load curve to the set of clustering inputs derived from state changes within the set of load curves to identify a target load curve within the set of load curves that closest matches the load curve, wherein the comparing comprises scoring predictor inputs based upon Euclidean distances between the predictor inputs and the set of clustering inputs, wherein the target load curve is identified based upon the target load curve having a score corresponding to a minimum Euclidean distance;

generate a predicted user schedule based upon an occupancy schedule assigned to the target load curve; and control settings of a thermostat using a heating schedule, a cooling schedule, or a heating and cooling schedule generated using the predicted user schedule.

14. The system of claim 13, wherein the usage data received by the usage data receiver indicates the quantity of at least one of electricity, gas, network bandwidth, or water used by the location over the plurality of days.

15. The system of claim 13, further comprising:

an occupancy schedule provider that transmits, via a network, the predicted user schedule at the location to a system controller that controls a system at the location.

16. The system of claim 15, wherein the system controller to which the occupancy schedule provider provides the predicted user schedule at the location comprises the thermostat that controls a heating system, a cooling system, or a heating and cooling system at the location.

17. The system of claim 13, wherein the predicted user schedule determined by the occupancy schedule determiner indicates time periods when the location is predicted to be occupied and time periods when the location is predicted to be unoccupied.

* * * * *